(12) United States Patent
Venkataraman et al.

(10) Patent No.: US 8,389,136 B2
(45) Date of Patent: Mar. 5, 2013

(54) GAS FLOW CONTROL ASSEMBLY FOR USE WITH FUEL CELL SYSTEMS OPERATING ON FUELS WITH VARYING FUEL COMPOSITION

(75) Inventors: Ramakirshnan Venkataraman, New Milford, CT (US); George Berntsen, Shelton, CT (US); Glenn L. Carlson, Bethlehem, CT (US); Fred C. Jahnke, Rye, NY (US); Anthony J. Leo, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1239 days.

(21) Appl. No.: 11/089,799

(22) Filed: Mar. 25, 2005

(65) Prior Publication Data
US 2006/0216556 A1 Sep. 28, 2006

(51) Int. Cl.
*H01M 8/04* (2006.01)
(52) U.S. Cl. .......... 429/34; 429/408; 429/427; 429/428; 429/443
(58) Field of Classification Search .................. None
See application file for complete search history.

(56) References Cited

U.S. PATENT DOCUMENTS

| | | | | |
|---|---|---|---|---|
| 5,803,507 A * | 9/1998 | Vu | ................................. | 285/23 |
| 6,124,054 A * | 9/2000 | Gorman et al. | ................. | 429/34 |
| 6,458,477 B1 * | 10/2002 | Hsu | ................................. | 429/17 |
| 2002/0146606 A1 * | 10/2002 | Kobayashi et al. | .............. | 429/24 |
| 2003/0054215 A1 * | 3/2003 | Doshi et al. | ..................... | 429/26 |
| 2003/0180592 A1 * | 9/2003 | Ueda et al. | ..................... | 429/30 |
| 2003/0224231 A1 | 12/2003 | Penev | | |
| 2004/0185315 A1 * | 9/2004 | Enjoji et al. | ..................... | 429/22 |
| 2005/0214604 A1 * | 9/2005 | Goto et al. | ..................... | 429/22 |
| 2005/0233188 A1 * | 10/2005 | Kurashima et al. | ............. | 429/13 |

FOREIGN PATENT DOCUMENTS

| | | |
|---|---|---|
| JP | 10-302820 | 11/1998 |
| JP | 2003-17104 | 1/2003 |
| JP | 2004-192958 | 7/2004 |

OTHER PUBLICATIONS

Supplementary European Search Report issued in counterpart EPO Application No. EP 05 71 0436 citing document 1 of US Published applications.

* cited by examiner

*Primary Examiner* — Ula C. Ruddock
*Assistant Examiner* — Alix Echelmeyer
(74) *Attorney, Agent, or Firm* — Cowan, Liebowitz & Latman, P.C.

(57) ABSTRACT

A gas flow control assembly for use in a fuel cell system comprising an airflow control assembly for adjusting flow of air to a cathode side of the fuel cell system based on content variations in an exhaust gas leaving an anode side of the system and a fuel flow control assembly for controlling flow of fuel to the anode side based on adjustment to the airflow by the airflow control assembly.

24 Claims, 4 Drawing Sheets

GAS FLOW CONTROL ASSEMBLY FOR USE WITH FUEL CELL SYSTEMS OPERATING ON FUELS WITH VARYING FUEL COMPOSITION

BACKGROUND OF THE INVENTION

This invention relates to fuel cells and, in particular, to a gas flow control assembly for use in fuel cell systems.

A fuel cell is a device, which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

Fuel cells operate by passing a reactant fuel gas through the anode, while oxidizing gas is passed through the cathode. The electrical output of the fuel cell system depends in part on the rates at which the fuel gas and the oxidizing gas are supplied to, and are carried through, the anode and the cathode, respectively, as well as on the energy content of the fuel. Therefore, in order to optimize the fuel cell performance and to obtain a desired electrical output from the fuel cell system, the flow rate at which the fuel is supplied to the cells needs to be precisely controlled.

Conventional fuel cell systems have typically employed mass flow controllers to control the flow rate of the fuel gas to the fuel cell anodes according to the power output of the fuel cell. Conventional systems have also employed an online fuel composition analyzer to determine the composition of the fuel being supplied to the fuel cell system. In particular, mass flow controllers have been used in combination with the online fuel composition analyzer to control the amount of fuel being delivered to the fuel cell based on the fuel composition determination by the composition analyzer and on the power output of the cell.

As can be appreciated, these conventional methods of controlling the flow rate of the fuel to the anodes require use of expensive and complex equipment. In addition, the reliability of the online fuel composition analyzer significantly declines when the fuel being analyzed has a high moisture content and also after prolonged operation of the analyzer. Therefore, the analyzer often needs to be re-calibrated to continue to accurately determine the fuel content. Accordingly, a means for controlling the fuel flow to the anode is needed which is accurate and reliable without requiring expensive equipment.

It is therefore an object of this invention to provide a gas flow control assembly for controlling the flow of fuel with increased reliability for prolonged periods of operation and which is not affected by the moisture levels in the fuel.

It is a further object of the invention to provide a gas flow control assembly which is capable of adjusting the fuel flow rate based on detected changes in fuel composition with increased accuracy.

SUMMARY OF THE INVENTION

In accordance with the principles of the present invention, the above and other objectives are realized in a gas flow control assembly for use in a fuel cell system comprising an airflow control assembly for adjusting flow of air to a cathode side of the fuel cell system based on or responsive to content variations in an exhaust gas leaving an anode side of the system and a fuel flow control assembly for controlling flow of fuel to the anode side of the fuel cell system based on adjustment to the airflow by the airflow control assembly. The fuel cell system includes an oxidizing assembly adapted to preheat air using the anode exhaust gas comprising unreacted fuel and the airflow control assembly adjusts the airflow so as to preheat the air in the oxidizing assembly to a predetermined temperature. The airflow control assembly includes an air trim controller for adjusting the airflow set point and an airflow controller for maintaining an air flow rate equal to the adjusted airflow set point to the system, the air trim controller comparing the temperature of the preheated air with the predetermined temperature to determine an adjustment value and adjusting the airflow set point based on the adjustment value. The air flow set point is a predetermined air flow rate based on the DC current, desired fuel flow, expected fuel heating value and ambient temperature. The air trim controller lowers the adjustment value if the temperature of the preheated air is less than the predetermined temperature and raises the adjustment value if the temperature of the preheated air is greater than the predetermined temperature, and the adjustment value is directly proportional to the airflow adjustment.

The fuel flow control assembly includes a fuel trim controller for adjusting the fuel flow set point to the system and a fuel flow controller to measure and maintain the fuel flow rate at adjusted fuel flow set point. The fuel flow set point is a predetermined fuel flow rate based on the DC current, desired excess over the minimum required fuel flow, and the expected fuel heating value. The fuel trim controller receives the adjustment value calculated by the air trim controller and modulates the fuel flow set point so as to maintain the air trim controller adjustment value in a predetermined range. In particular, the air trim controller raises and lowers the adjustment value incrementally by a set amount, e.g., 1, for increases and decreases, respectively, in the temperature of preheated air when the temperature is greater than the predetermined temperature, and lowers and raises the adjustment value incrementally by the set amount, e.g., 1, for decreases and increases, respectively, in the temperature of preheated air when the temperature is smaller than the predetermined temperature, and the fuel trim controller adjusts the fuel flow set point so as to maintain the air trim controller adjustment value between 0 and minus (−) the set amount, e.g., 1.

Also disclosed is a fuel cell system employing the gas flow control assembly.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
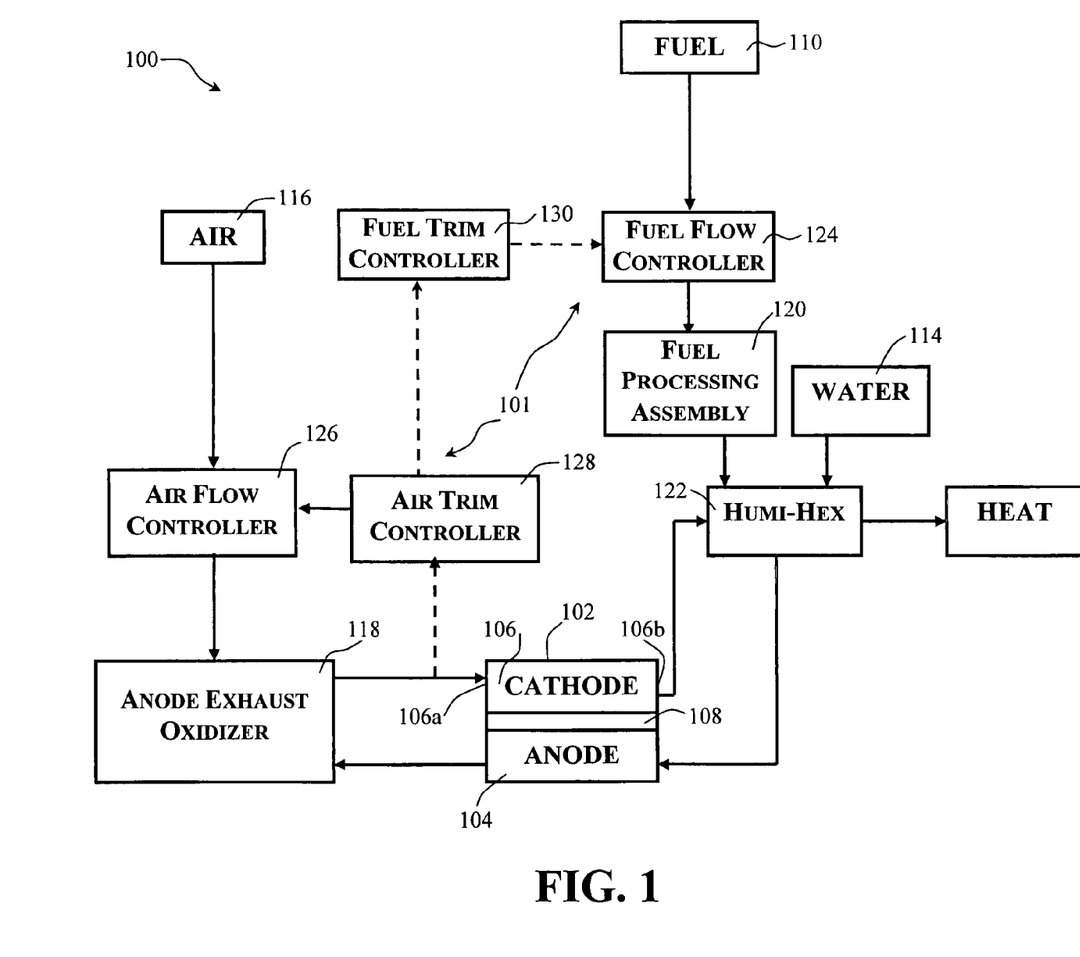
FIG. 1 shows a fuel cell system employing a gas flow adjustment assembly in accord with the principles of the present invention.

FIG. 1 shows a fuel cell system 100 employing a gas flow control assembly 101 in accord with the principles of the present invention. The gas flow control assembly 101 includes a fuel flow controller 124 which may include a fuel flow meter and an automated control valve, an airflow controller 126 which may include an air flow meter and an automated control valve, an air trim controller 128 and a fuel trim controller 130, all used to control the flow of fuel and air to the anode side 104 and the cathode side 106, respectively, of a fuel cell 102 of the system 100. The anode and cathode sides of the fuel cell 102, are, in turn, separated by an electrolyte 108.

The fuel cell system also includes a fuel supply 110 for supplying fuel gas to the anode side 104 of the fuel cell 102, a water supply 114 for humidifying the fuel gas, an air supply 116 for supplying oxidant gas to the cathode side 106 of the fuel cell 102 and an anode exhaust oxidizer 118. A fuel processing assembly 120 provides fuel clean up and a heat exchanger 122 humidifies and preheats the fuel before it enters the anode side 104 of the fuel cell 102.

In the system 100, fuel from the supply 110 is supplied to the fuel processing assembly 120 at a flow rate determined by the fuel trim controller 130 and controlled by the fuel flow controller 124 of the flow control assembly 101. Fuel processing assembly 120 cleans and further processes the fuel so that it is suitable for use in the fuel cell anode 104. The processing assembly 120 may include a desulfurizer unit. Prior to entry into the fuel cell anode 104 the processed fuel is first coupled through the heat exchanger 122 where it is mixed with water supplied from the water supply 114 and pre-heated to a temperature of 300° C. The heat exchanger 122 may also include a pre-reforming unit and a deoxidizing unit. The humidified and preheated fuel is then conveyed to the fuel cell anode 104 where it undergoes an electrochemical reaction producing an electrical output.

Anode exhaust gas comprising unspent fuel is conveyed from the anode 104 to the anode exhaust oxidizer 118. The anode exhaust oxidizer also receives air supplied from the air supply 116, after the air has been controlled by the airflow controller 126 to an air flow set point adjusted by the air trim controller 128. In the anode exhaust oxidizer 118, air is mixed with the anode exhaust gas and combusted to produce heated air or oxidant gas and carbon dioxide.

The temperature of the preheated oxidant gas is dependent on the amount of unreacted fuel present in the anode exhaust gas and the airflow rate from the air supplied to the oxidizer. As can be appreciated, the amount of unreacted fuel in the anode exhaust is dependent in part on the fuel flow rate and on the fuel's heating value, or the amount of energy produced by combusting the fuel, which itself is dependent on the fuel content variations.

Heated oxidant gas leaving the oxidizer 118 is thereafter conveyed to the cathode side inlet 106a of the fuel cell 102. Depleted oxidant gas exits the cathode 106 through a cathode outlet 106b and flows through the heat exchanger 122 where heat from the exhausted oxidant gas is transferred to preheat the fuel and water mixture. Heat remaining in the exhausted oxidant gas after it leaves the heat exchanger 122 may be used in a variety of functions including steam formation or space heating.

As mentioned above and shown in FIG. 1, the fuel flow rate of the fuel from the supply 110 is controlled by the fuel flow controller 124 which receives a fuel flow set point that is modulated by the fuel trim controller 130 of the gas flow control assembly 101, while the airflow rate of the air from the supply 116 is controlled by the airflow controller 126 to a set point determined by the air trim controller 128 of the assembly 101.

In particular, fuel gas is supplied from the fuel supply 110 to the system 100 at a predetermined flow rate, which is preferably the fuel flow rate required for the optimum operation and electrical output of the fuel cell 102. In an illustrative case described herein, the fuel flow rate is approximately 40% in excess of the amount consumed in the anode 104 of the fuel cell 102 for generation of the electrical output. The excess fuel flow results in unreacted fuel being present in the anode exhaust gas which is then used in the oxidizer 118 to combust and preheat the air to a required temperature. The predetermined fuel flow rate is determined based on a desired electrical output of the system 100 and on the heating value or the hydrogen content of the fuel gas supplied from the fuel supply 110. The fuel flow controller 124, which may comprise a thermal mass fuel flow meter, measures the fuel flow rate from the supply 110 and partially corrects the flow rate based on changes in fuel composition and the fuel heating value and controls the fuel flow rate to the pre-determined fuel flow set point described above.

In the event the heating value or the actual controlled fuel flow rate varies from the expected value, the fuel trim controller 130 based on the input from the air trim controller 126 will adjust the predetermined fuel flow set point, using an automatic fuel flow adjustment logic described in more detail herein below.

As also shown in FIG. 1 and mentioned above, the airflow rate of the air from the air supply 116 is controlled by the airflow controller 126 to an air flow set point adjusted by the air trim controller 128. The air trim controller 128 modulates the pre-determined airflow rate set point, which is determined based on a desired electrical output and the temperature of the air supplied from the air supply 116.

In accord with the invention, the air trim controller 128 adjusts the pre-determined airflow set point so as to maintain the oxidant gas preheated in the oxidizer 118 and supplied to the cathode inlet 106a at a predetermined or set point temperature TSP. As described in more detail herein below, the air trim controller 128 compares the temperature of the oxidant gas entering the cathode inlet 106a with the set point temperature TSP and calculates an adjustment or air trim value, and then adjusts the airflow rate set point based on the calculated air trim value. If the air trim value calculated by the air trim controller 128 is zero, no changes are made to the airflow rate set point by the air trim controller 128. If the calculated air trim value is positive, then the air trim controller 128 increases the airflow rate set point by an amount proportional to the air trim value, and if the air trim value is negative, the air trim controller 128 reduces the airflow rate set point by an amount proportional to the air trim value.

Figure 2:
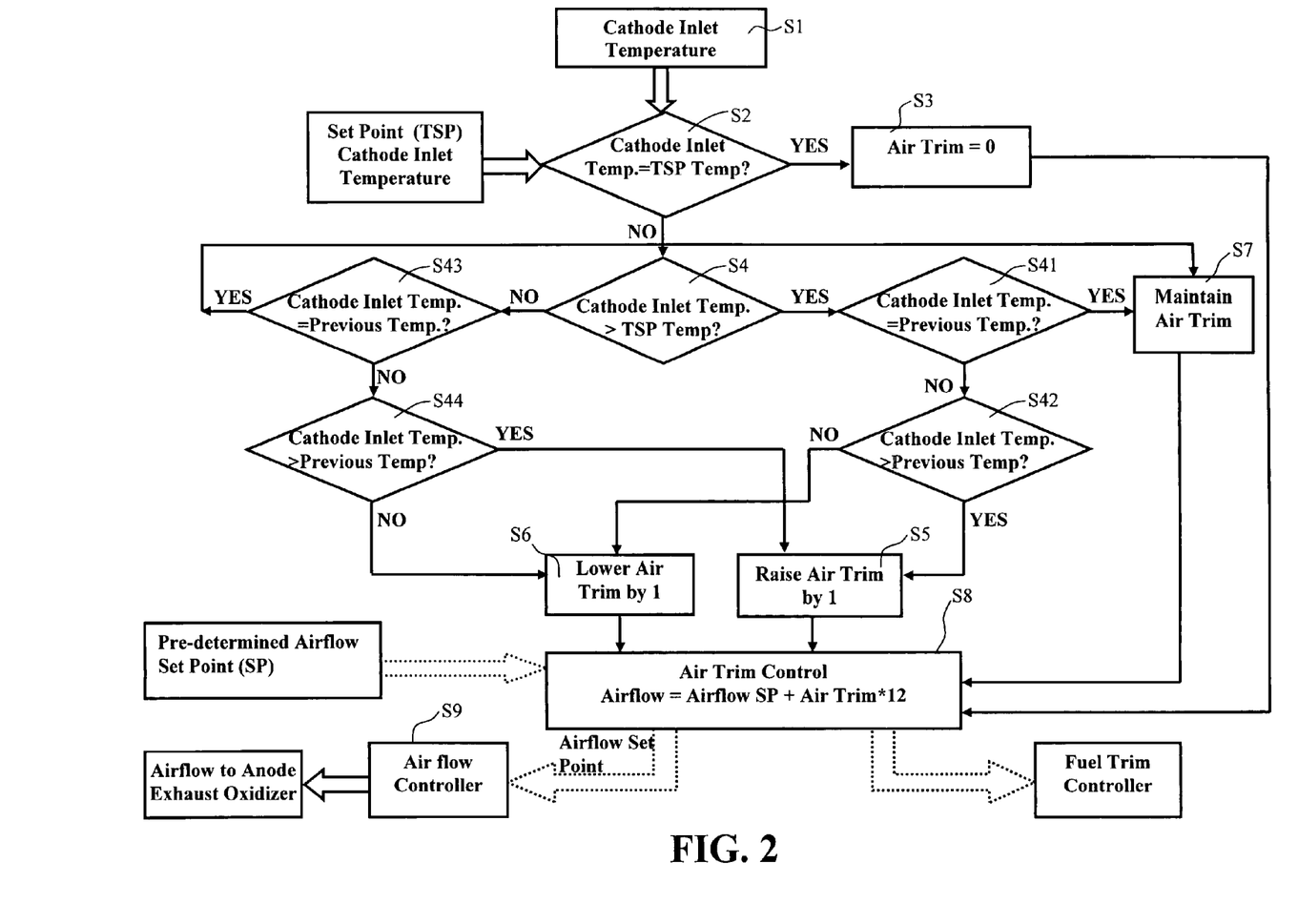
FIG. 2 shows a flow chart of operations of an air trim controller of the gas flow adjustment assembly of FIG. 1.

More particularly, the operation of the air trim controller 128 is illustrated in more detail in the flow chart shown in FIG. 2. As shown, in a first step S1, the controller 128 measures the temperature of the oxidant gas entering the cathode inlet 106a. In the next step S2, the air trim controller 128 compares the temperature of the oxidant gas obtained in the first step S1 with the set point temperature TSP. As mentioned above, the temperature of the preheated oxidant gas from the oxidizer 118 is dependent on the airflow rate and the amount of unreacted fuel present in the anode exhaust gas. The set point temperature TSP is a predetermined temperature set for when the anode exhaust gas has an optimum fuel content and the airflow is at the unmodulated constant set point value determined by the air trim controller 128.

More particularly, the fuel content in the anode exhaust gas is directly related to the heating value of the fuel, the pre-determined fuel flow rate being set based on the highest expected heating value of the fuel and, in such case, the fuel content in the anode exhaust gas is optimum when the fuel supplied to the system 101 has a highest expected heating value. During the system operation, the content of the fuel deviates from the optimum content, and as a result, the temperature of the preheated oxidant gas from the oxidizer 118 varies from the set point temperature TSP. When such fuel content variations occur, the temperature of the heated oxidant gas can be maintained at the set point temperature TSP by adjusting the airflow, the fuel flow or both.

In particular, when the fuel content in the anode exhaust is smaller than the optimum content and the cathode inlet temperature is lower than the set point temperature TSP, the cathode inlet temperature can be returned to the set point temperature TSP by decreasing the airflow or increasing the fuel flow until the set point temperature TSP is reached. If, however, the fuel content in the anode exhaust is greater than the optimum content, the set point temperature TSP can be reached by increasing the airflow or decreasing the fuel flow so as to lower the cathode inlet temperature to the set point temperature.

Referring back to FIG. 2, if the air trim controller 128 determines in the step S2 that the cathode inlet temperature of the oxidant gas obtained in step S1 is equal to the set point temperature TSP, then the fuel content in the anode exhaust is at the optimum value and the air trim controller 128 sets the air trim value at zero in step S3 and proceeds to step S8. In such case, the airflow set point will not be changed by the air trim controller 128, thus remaining at the pre-determined constant airflow set point described earlier, and the air flow rate will then be controlled to this set point by the airflow controller 126.

If the air trim controller in step S2 determines that the cathode inlet temperature of the oxidant gas is not equal to the set point temperature TSP, then in step S4, the air trim controller determines whether cathode inlet temperature of the oxidant gas is higher then the set point temperature TSP. If yes, the air trim controller in step S41 determines whether the cathode inlet temperature of the oxidant gas is equal to or within a predetermined range from the previously measured value of cathode inlet temperature. If yes, then process proceeds to step S7 where the current air trim value is maintained. If not, then process proceeds to step S42 where it is determined if the cathode inlet temperature of the oxidant gas is greater than the previously measured value of cathode inlet temperature. If no, process proceeds to step S6, where the air trim controller decreases the air trim value by a predetermined incremental value, which in the present case is 1. If yes, the air trim controller in step S5 increases the air trim value by the incremental value 1.

If in step S4, the air trim controller determines that the cathode inlet temperature of the oxidant gas is not higher than the set point temperature TSP, the air trim controller in step S43 determines whether the cathode inlet temperature of the oxidant gas is equal to or within a predetermined range from the previously measured value of cathode inlet temperature. If yes, process proceeds to step S7 where the air trim controller maintains the air trim value. If not, process proceeds to step S44, where the air trim controller determines whether the cathode inlet temperature of the oxidant gas is higher than the previously measured cathode inlet temperature. If no, in step S6, the air trim controller decreases the air trim value by the predetermined incremental value 1. If yes, the air trim controller in step S7 increases the air trim value by the incremental value 1.

The air trim value determined in steps S5, S6 or S7 is then used by the air trim controller 128 in step S8 to calculate an adjustment to the airflow set point. This adjusted air flow set point is provided to the air flow controller. In this step, the correction to the pre-determined set point airflow ASP is made using the following formula and provided to the airflow controller 126:

$$\text{Adjusted Airflow} = \text{ASP} + \text{Air Trim} * 12 \quad (1)$$

in which Adjusted Airflow is the air flow set point provided to the airflow controller 126, ASP is the pre-determined air flow set point based on the DC current, expected fuel flow rate, expected heating value of fuel, and temperature of the air from the air supply 116 and Air Trim is the air trim value calculated by the air trim controller 128 in step S5, S6 or S7.

As can be seen from the formula (1), the adjusted airflow will be equal to the constant set point airflow ASP when the air trim value is equal to zero. A positive air trim value will result in a greater adjusted airflow so that more air is supplied to the oxidizer 118. When the air trim value is negative, the adjusted airflow will be smaller than the set point airflow ASP and, therefore, less air will be supplied from the air supply to the oxidizer 118. In step S9 of the air trim controller 128 operation, the air flow is supplied to the anode exhaust oxidizer at the adjusted airflow rate calculated in step S8.

The modulation of the airflow rate set point by the air trim controller 128 of the gas flow control assembly 101 allows the oxidant gas to be heated to the set point temperature TSP before it is conveyed to the fuel cell cathode 106 and also results in a proper amount of oxidant gas being delivered to the cathode. Moreover, as shown in FIGS. 1 and 2 and as mentioned above, the operation of the air trim controller 128 is used as a feedback by the fuel trim controller to control fuel flow to the fuel cell system.

In particular, changes in the air trim value calculated by the air trim controller 128 are directly related to changes in the content (composition and heating value) of the fuel gas during the system's operation. In accord with the invention, the fuel trim controller of the gas flow control assembly 101 uses automatic fuel flow adjustment logic to sense the changes in the air trim value and adjust the fuel flow rate set point in response to such changes. In particular, in response to a change in the air trim value by the air trim controller 128, the fuel trim controller 130 adjusts the fuel flow set point so as to maintain the air trim value within a predetermined range. In this illustrative arrangement, the predetermined air trim value range maintained is between 0 and −1. The fuel flow set point is a pre-determined value based on the current, expected heating value of the fuel and the desired excess fuel flow rate over the amount consumed in the anode 104 of the fuel cell 102 for generation of the electrical output.

Accordingly, when the fuel trim controller 130 senses a reduction in the air trim value calculated by the air trim controller, the fuel trim controller 130 changes the fuel flow rate set point to provide additional fuel flow to bring the air trim value within the predetermined range. Similarly, when an increase in the air trim value is sensed by the fuel trim controller, the fuel flow rate set point is modified by the fuel trim controller 130 to reduce the amount of fuel until the air trim value is within the predetermined range.

Figure 3:
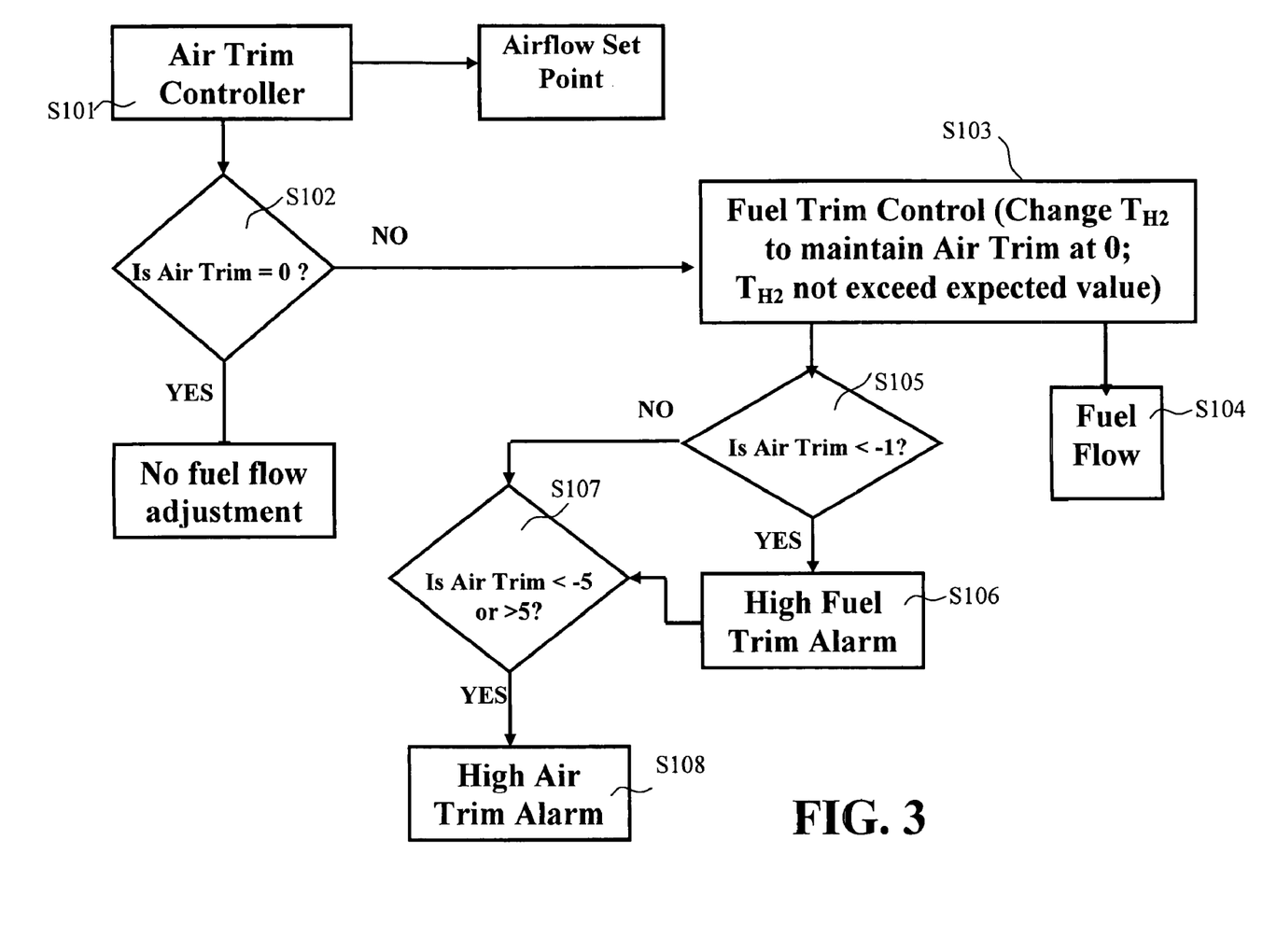
FIG. 3 shows a flow chart of operations of a fuel trim controller of the gas flow adjustment assembly of FIG. 1.

The operation of the fuel trim controller 130 will now be described in detail with reference to FIG. 3, which shows a flow chart of the automatic fuel flow adjustment logic of the fuel trim controller 130. As shown in FIG. 3, in a first step S101, the fuel trim controller 130 receives a signal from the air trim controller 128 indicating a change in the air trim value calculated by the air trim controller 128.

In a second step S102 of the automatic fuel flow adjustment logic, the fuel trim controller 130 determines whether the air trim value is equal to 0. If the air trim value is 0, then no adjustment is made to the fuel flow rate set point. If the adjustment logic determines that the air trim value is not equal to 0, then the operation proceeds to step S103 in which the fuel trim controller 130 changes the fuel flow rate in step S104 by changing a fuel hydrogen content parameter, $T_{H2}$, so as to change the air trim value determined by the air trim controller 128 to 0. The hydrogen content parameter, $T_{H2}$, is a parameter which represents the volume of hydrogen in cubic feet that can be generated from 1 cubic ft of the fuel. For example, a fuel gas that contains >99% methane will have a $T_{H2}$ of 4. The parameter $T_{H2}$ thus establishes a gas composition and heating value, and is used to calculate the fuel flow rate set point. A higher $T_{H2}$ is indicative of a fuel gas with a higher heating value and a lower $T_{H2}$ is indicative of a gas with a lower heating value.

In step S103, the $T_{H2}$ parameter is adjusted in small increments or decrements. In an illustrative case, the adjustment increment for the $T_{H2}$ parameter may be 0.02. The $T_{H2}$ parameter is adjusted until the air trim value calculated by the air trim controller 128 reaches the desired value, "0" in this case. The adjusted $T_{H2}$ parameter is not allowed to exceed its predetermined highest expected value. In addition, the amount of allowable change in the $T_{H2}$ parameter by the fuel trim controller 130 may be limited. In the present illustrative case, the maximum change in $T_{H2}$ is limited to 6%. When the $T_{H2}$ parameter is reduced by the fuel trim controller 130, the fuel flow rate set point is caused to increase, and when it is increased, the fuel flow rate set point is caused to decrease.

Therefore, in step S103, fuel trim controller 130 actively adjusts the $T_{H2}$ parameter to maintain the air trim value at the desired air trim value, e.g. "0". After the $T_{H2}$ parameter is adjusted, the fuel flow rate is changed in step S104.

In some cases, the fuel trim controller 130 is unable to maintain the desired air trim value by adjusting the $T_{H2}$ parameter as would be the case when the $T_{H2}$ parameter has been changed by the maximum permitted amount. When the fuel trim controller is unable to maintain the desired air trim value, the operation of the fuel trim controller proceeds to step S105. In step S105, which also follows step S104, the fuel trim controller 130 determines whether the air trim value is less than −1, and if so, the operation proceeds to step S106 in which a high fuel trim alarm is triggered. The high fuel trim alarm indicates that the heating value of the fuel is significantly lower than expected and that the fuel trim has already been adjusted to the maximum permitted extent by reducing the $T_{H2}$ parameter. The high fuel trim alarm will prompt an operator to examine the heating value of the fuel. If the heating value of the fuel changes further, the air trim value may continue to drop further below "−1". In this case, as described above with respect to FIG. 2, the air trim controller 128 will change the air trim value, which in turn affects the total air flow, in order to maintain the temperature of the gas flowing into the cathode at the desired temperature set point.

When the air trim value is positive, the fuel trim controller 130 will increase the $T_{H2}$ parameter until the air trim value reaches "0" or until the $T_{H2}$ parameter reaches the pre-determined highest expected value. The air trim value may continue to increase further if the heating value of the fuel gas increases further beyond the highest expected heating value.

Following the triggering of the high fuel trim alarm in step S106, or if the fuel trim controller 130 determines that the air trim value is positive in step S105, the operation of the adjustment logic proceeds to step S107. In step S107, the fuel trim controller 130 determines whether the air trim value is greater than a predetermined value, e.g. 5, or smaller than a predetermined value, e.g. −5. As shown in FIG. 3, if the air trim value is greater than 5 or smaller than −5, then the operation proceeds to step S108 in which a high air trim alarm is triggered. The triggering of the high air trim alarm without also triggering the high fuel trim alarm indicates that the heating value of the fuel gas is significantly higher than the highest expected value. The triggering of the high air trim alarm together with the high fuel trim alarm would mean that the heating value of the fuel gas is significantly lower than expected and fuel trim controller 130 is unable to compensate any further. This alarm would prompt the operator to initiate a corrective action.

Figure 4:
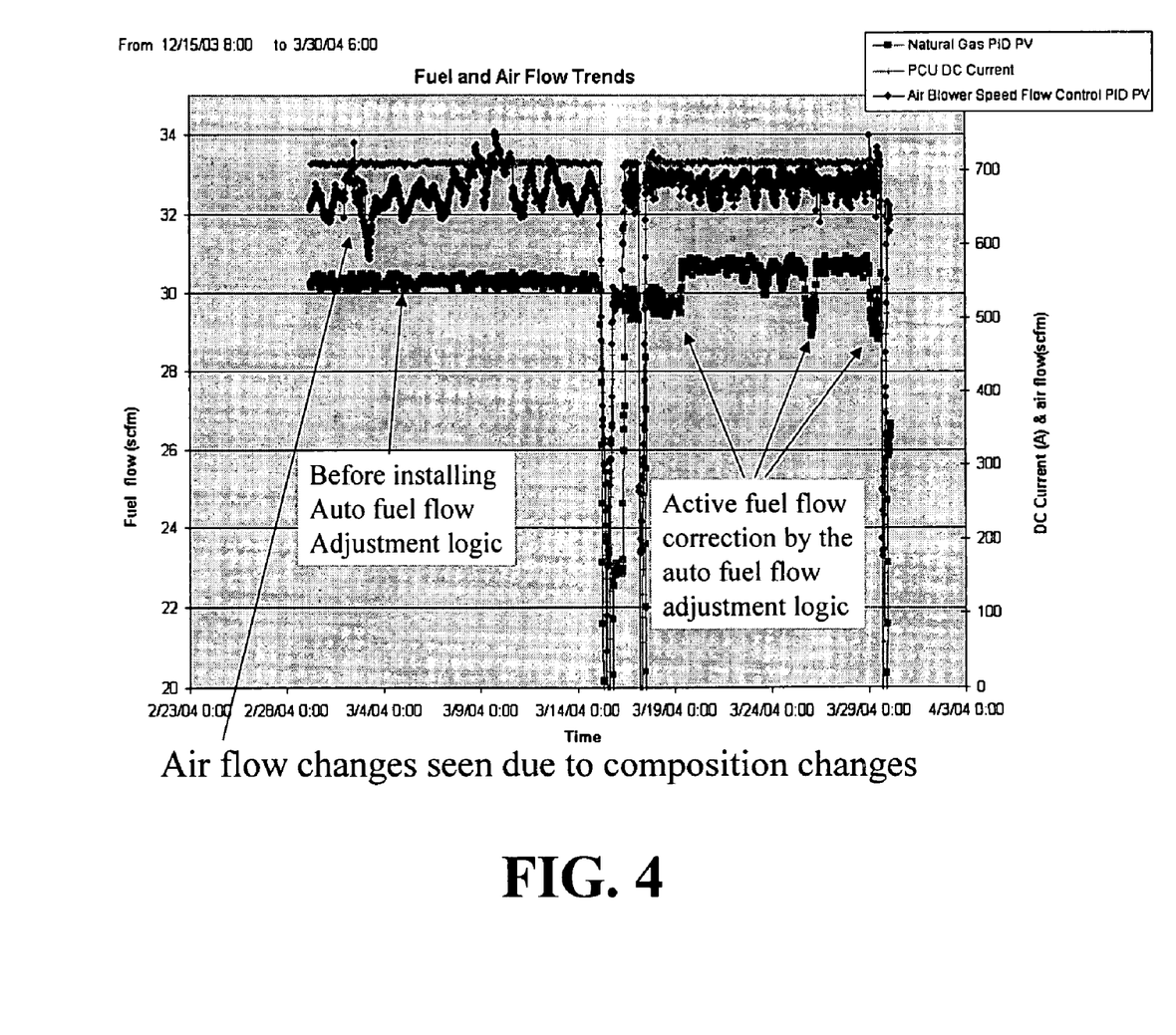
FIG. 4 shows a graph of performance data of a system employing the gas flow adjustment assembly with and without the fuel trim controller.

The performance of a system 100 employing the gas flow control assembly 101 with the fuel flow trim control as shown in FIG. 1 was tested and compared with the same system without this control. FIG. 4 shows a graph of performance data of the tested system. In FIG. 4, the X-axis represents the operating time of the system 100, while the Y-axis represents the fuel flow rate in scfm units, the DC current in Amperes and the airflow rate in scfm units. In testing the performance of the system with the fuel trim control installed, the fuel flow and airflow rates and the DC current produced by the system were recorded during the system operation.

During a first operating time period, the fuel cell system tested employed a gas flow control assembly without the fuel trim controller 130 to correct the fuel flow rate to the system. During a second operating time period, the system tested included the gas flow control assembly 101 employing the fuel trim controller 130 as shown in FIG. 1. As can be seen, the fuel flow rate was substantially constant at about 30.1 scfm during the first operating time period, while frequent adjustments were made to the airflow due to changes in the content of the fuel such that the airflow rate ranged from 590 to 760 scfm.

During the second operating time period, both the fuel flow and the airflow rates were adjusted by the gas flow control system, such that the fuel flow rates ranged between about 29.3 and 31 scfm, while the air flow rates ranged between 630 and 720 scfm. The DC current produced by the system during the first and second operating time periods remained relatively constant at about 700 Amperes. As can be seen from the performance data in FIG. 4, the gas flow control assembly 101 using the automatic fuel flow adjustment logic of the fuel trim controller 130 employs a more precise control of fuel flow supplied to the system, which also results in smaller changes in the airflow rates. Such precise control allows the system to quickly adapt to the changes in fuel content so that an appropriate amount of fuel is supplied to the system and the current produced by the system is maintained at a constant level.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

We claim:

1. A gas flow control assembly for use in a fuel cell system, comprising: an airflow control assembly which adjusts flow rate of air to a cathode side of said fuel cell system based on variations in amount of unreacted fuel in an anode exhaust gas leaving an anode side of said fuel cell system; and a fuel flow control assembly including a controller programmed to control flow rate of fuel to said anode side of said fuel cell system based directly on adjustment to said air flow rate by said airflow control assembly, wherein the fuel cell system includes an oxidizing assembly for preheating the air to a predetermined temperature using anode exhaust gas containing unreacted fuel; and the airflow control assembly adjusts the air flow rate based on variations in temperature from the predetermined temperature of the preheated air resulting from changes in the amount of unreacted fuel in the anode exhaust gas so as to maintain the temperature of the preheated air at the predetermined temperature.

2. A gas flow control assembly for use in a fuel cell system in accordance with claim 1, wherein said airflow control assembly includes: an airflow controller for controlling said air flow to an air flow set point which results in said oxidizing assembly preheating said air to said predetermined temperature when said content of said anode exhaust is said given content; and
an air trim controller for providing said airflow set point to said airflow controller, said air trim controller comparing the temperature of said preheated air with said predetermined temperature to determine an adjustment value and adjusts said airflow set point based on said adjustment value.

3. A gas flow control assembly for use in a fuel cell system in accordance with claim 2, wherein said air trim controller lowers and raises said adjustment value incrementally for decreases and increases, respectively, in said temperature of said preheated air when said temperature of said preheated air is less than said predetermined temperature, and raises and lowers said adjustment value incrementally for increases and decreases, respectively, in said temperature of said preheated when said temperature of said preheated air is greater than said predetermined temperature, and wherein said adjustment value is directly proportional to the airflow adjustment by said air trim controller.

4. A gas flow control assembly for use in a fuel cell system in accordance with claim 3, wherein: said incremental value is 1, and wherein said air trim controller controls said airflow such that Airflow=Set Point Airflow+Adjustment Value*12.

5. A gas flow control assembly for use in a fuel cell system in accordance with claim 3, wherein said controller of said fuel flow control assembly comprises a fuel trim controller for adjusting fuel flow set point to said system, wherein said fuel trim controller receives said adjustment value calculated by said air trim controller and adjusts said fuel flow set point so as to maintain said adjustment value in a predetermined range.

6. A gas flow control assembly for use in a fuel cell system in accordance with claim 5, wherein said incremental value is 1, and wherein said fuel trim controller adjusts the fuel flow so as to maintain said adjustment value between 0 and −1.

7. A gas flow control assembly for use in a fuel cell system in accordance with claim 6, wherein said fuel trim controller increases said fuel flow if said adjustment value is less than −1.

8. A gas flow control assembly for use in a fuel cell system in accordance with claim 5, wherein said fuel flow control assembly further comprises a fuel flow controller for controlling fuel flow from a fuel supply to said fuel flow set point after said fuel trim controller adjusts said predetermined fuel flow set point and a fuel flow meter to measure said fuel flow rate.

9. A gas flow control assembly for use in a fuel cell system in accordance with claim 8, wherein said predetermined fuel flow rate exceeds a minimum required fuel flow rate for producing a predetermined electrical output by said system.

10. A gas flow control assembly for use in a fuel cell system in accordance with claim 9, wherein said predetermined fuel flow rate exceeds said minimum required fuel flow rate by 40 percent.

11. A gas flow control assembly for use in a fuel cell system in accordance with claim 10, wherein said fuel flow meter is a thermal mass flow meter.

12. A gas flow control assembly for use in a fuel cell system in accordance with claim 11, wherein said airflow set point is determined based on said predetermined electrical output of said system and the temperature of said air supplied to said system.

13. A fuel cell system for use with an air supply and a fuel supply, said fuel cell system comprising:
a fuel cell including an anode side and a cathode side;
a fuel inlet for receiving fuel from fuel supply for supply to said anode side;
an air inlet for receiving air from said air supply for supply of oxidant gas to cathode side;
an oxidizing assembly for preheating the air to a predetermined temperature using anode exhaust gas containing unreacted fuel,
a gas flow control assembly including an airflow control assembly which adjusts flow rate of the air from said air inlet based on variations in amount of unreacted fuel in the anode exhaust gas leaving the anode side and a fuel flow control assembly including a controller programmed to control fuel flow rate of fuel from said fuel inlet,
wherein the airflow control assembly adjusts the air flow rate based on variations in temperature from the predetermined temperature of the preheated air resulting from changes in the amount of unreacted fuel in the anode exhaust gas so as to maintain the temperature of the preheated air at the predetermined temperature; and
said controller of said fuel flow control assembly is programmed to control side of said fuel cell system based directly on adjustment to said air flow rate by said airflow control assembly.

14. Fuel cell system in accordance with claim 13, wherein said airflow control assembly includes: an airflow controller for controlling said air flow to an air flow set point which results in said oxidizing assembly preheating said air to said predetermined temperature when said content of said anode exhaust is said given content; and an air trim controller for providing said airflow set point to the said airflow controller, said air trim controller comparing the temperature of said preheated air with said predetermined temperature to determine an adjustment value and adjusts said airflow based on said adjustment value.

15. Fuel cell system in accordance with claim 14, wherein said air trim controller lowers and raises said adjustment value incrementally for decreases and increases, respectively, in said temperature of said preheated air when said temperature of said preheated air is less than said predetermined temperature, and raises and lowers said adjustment value incrementally for increases and decreases, respectively, in said temperature of said preheated when said temperature of said preheated air is greater than said predetermined temperature, and wherein said adjustment value is directly proportional to the airflow adjustment by said air trim controller.

16. Fuel cell system in accordance with claim 15, wherein said set point airflow rate is determined based on a predetermined electrical output of said system and the temperature of said oxidizing gas supplied from said air supply.

17. Fuel cell system in accordance with claim 16, wherein said controller of said fuel flow control assembly comprises a fuel trim controller for adjusting fuel flow to said anode side, wherein said fuel trim controller receives said adjustment value calculated by said air trim controller and adjusts said fuel flow so as to maintain said adjustment value in a predetermined range.

18. Fuel cell system in accordance with claim 17, wherein said incremental value is 1, and wherein said fuel trim controller adjusts the fuel flow so as to maintain said adjustment value between 0 and −1.

19. Fuel cell system in accordance with claim 18, wherein said fuel trim controller increases the fuel flow from said fuel supply if said adjustment value is less than −1.

20. Fuel cell system in accordance with claim 17, wherein said fuel flow control assembly further comprises a fuel flow controller for controlling fuel flow from a fuel supply to a fuel flow set point after said fuel trim controller adjusts said predetermined fuel flow set point and a fuel flow meter to measure said fuel flow rate.

21. Fuel cell system in accordance with claim 20, wherein said predetermined fuel flow rate exceeds a minimum required fuel flow rate for producing said predetermined electrical output.

22. Fuel cell system in accordance with claim 21, wherein said predetermined fuel flow rate exceeds the minimum required fuel flow rate by 40%.

23. Fuel cell system in accordance with claim 22, wherein said fuel flow meter is a thermal mass flow meter.

24. Fuel cell system in accordance with claim 23, wherein said system further comprises a fuel processing assembly for pre-processing said fuel from said fuel inlet and a heat exchanger for heating pre-processed fuel, an outlet of said heat exchanger being coupled with an inlet of said anode side.

* * * * *